US012641029B2

(12) United States Patent
Zheng et al.

(10) Patent No.: US 12,641,029 B2
(45) Date of Patent: May 26, 2026

(54) DATA CENTER NETWORK LOAD BALANCING METHOD, AND SYSTEM, COMMUNICATION DEVICE, AND STORAGE MEDIUM

(71) Applicant: Ruijie Networks Co., Ltd., Fuzhou (CN)

(72) Inventors: Chao Zheng, Fuzhou (CN); Ligen Lai, Fuzhou (CN)

(73) Assignee: Ruijie Networks Co., Ltd., Fuzhou (CN)

( * ) Notice: Subject to any disclaimer, the term of this patent is extended or adjusted under 35 U.S.C. 154(b) by 0 days.

(21) Appl. No.: 19/230,181

(22) Filed: Jun. 6, 2025

(65) Prior Publication Data

US 2025/0300934 A1 Sep. 25, 2025

Related U.S. Application Data

(63) Continuation of application No. PCT/CN2024/090940, filed on Apr. 30, 2024.

(30) Foreign Application Priority Data

Oct. 8, 2023 (CN) .......................... 202311293576.7

(51) Int. Cl.
*H04L 47/125* (2022.01)
*G06F 9/50* (2006.01)
*H04L 45/741* (2022.01)

(52) U.S. Cl.
CPC .......... *H04L 47/125* (2013.01); *G06F 9/5083* (2013.01); *H04L 45/741* (2013.01)

(58) Field of Classification Search
CPC .... H04L 47/125; H04L 45/741; G06F 9/5083
See application file for complete search history.

(56) References Cited

U.S. PATENT DOCUMENTS

2016/0234300 A1* 8/2016 Khanna ................. G06F 9/5083
2019/0079869 A1 3/2019 Baldi et al.
(Continued)

FOREIGN PATENT DOCUMENTS

CN 103155500 A 6/2013
CN 104662850 A * 5/2015 ........... H04L 45/122
(Continued)

OTHER PUBLICATIONS

International Search Report and Written Opinion received for PCT Patent Application No. PCT/CN2024/090940, mailed on Jun. 29, 2024, 10 pages (5 pages of English Translation and 5 pages of Original Document).

*Primary Examiner* — Sujoy K Kundu
*Assistant Examiner* — Raul Rivas
(74) *Attorney, Agent, or Firm* — ArentFox Schiff LLP; Michael Fainberg

(57) ABSTRACT

This application provides a data center network load balancing method, and system, a communication device, and a storage medium. The method includes: obtaining information of a plurality of computing nodes; determining, based on the information of the plurality of computing nodes, forwarding paths corresponding to the plurality of computing nodes, where the forwarding paths corresponding to the plurality of computing nodes are equal-cost forwarding paths, and the forwarding paths corresponding to the plurality of computing nodes are different from each other; and when receiving a data flow, forwarding the data flow based on a forwarding path corresponding to a target computing node of the data flow.

13 Claims, 7 Drawing Sheets

(56) References Cited

U.S. PATENT DOCUMENTS

2020/0389358 A1 * 12/2020 Kamath ............. H04L 41/0672
2022/0263756 A1 * 8/2022 Wang ..................... H04L 45/44
2023/0164080 A1 5/2023 Du et al.
2024/0070038 A1 * 2/2024 Kangarlou ............ G06F 11/301

FOREIGN PATENT DOCUMENTS

CN       114513428 A    5/2022
CN       115733799 A    3/2023
WO    WO-2022174789 A1 *  8/2022  ......... H04L 41/0246

* cited by examiner

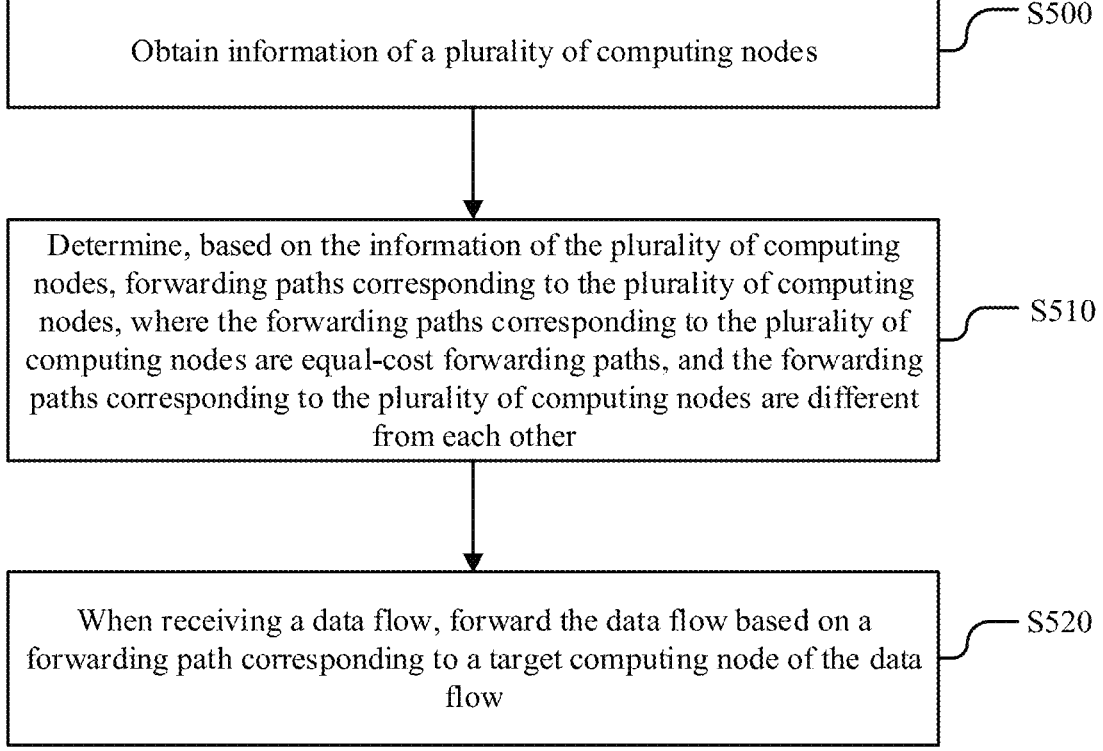

Obtain information of a plurality of computing nodes — S500

Determine, based on the information of the plurality of computing nodes, forwarding paths corresponding to the plurality of computing nodes, where the forwarding paths corresponding to the plurality of computing nodes are equal-cost forwarding paths, and the forwarding paths corresponding to the plurality of computing nodes are different from each other — S510

When receiving a data flow, forward the data flow based on a forwarding path corresponding to a target computing node of the data flow — S520

FIG. 5

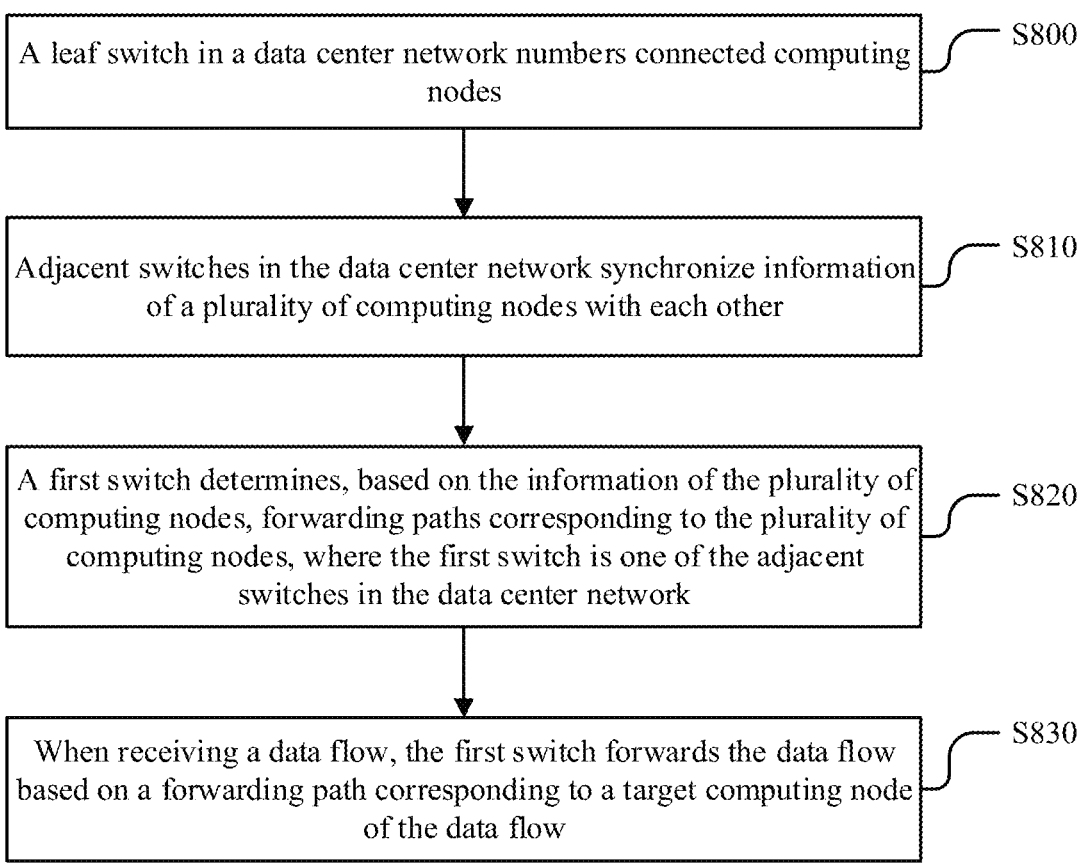

A leaf switch in a data center network numbers connected computing nodes — S800

Adjacent switches in the data center network synchronize information of a plurality of computing nodes with each other — S810

A first switch determines, based on the information of the plurality of computing nodes, forwarding paths corresponding to the plurality of computing nodes, where the first switch is one of the adjacent switches in the data center network — S820

When receiving a data flow, the first switch forwards the data flow based on a forwarding path corresponding to a target computing node of the data flow — S830

FIG. 8

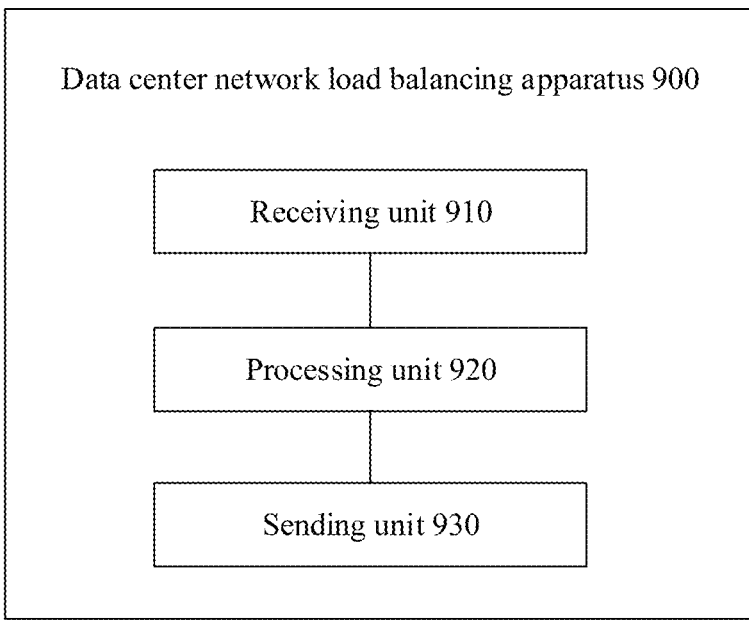

Data center network load balancing apparatus 900

Receiving unit 910

Processing unit 920

Sending unit 930

FIG. 9

DATA CENTER NETWORK LOAD BALANCING METHOD, AND SYSTEM, COMMUNICATION DEVICE, AND STORAGE MEDIUM

CROSS-REFERENCE TO RELATED APPLICATIONS

This application is a continuation of International Application No. PCT/CN2024/090940, filed on Apr. 30, 2024, which claims priority to Chinese Patent Application No. 202311293576.7, filed with the China National Intellectual Property Administration on Oct. 8, 2023, and entitled "DATA CENTER NETWORK LOAD BALANCING METHOD AND APPARATUS", which are incorporated herein by reference in their entireties.

TECHNICAL FIELD

This application relates to the field of network technologies, and in particular, to a data center network load balancing method, and system, a communication device, and a storage medium.

BACKGROUND

Currently, a data center network usually uses remote direct memory access (RDMA) over an Ethernet transmission link for communication, that is, use of an RDMA over Ethernet (RDMA over Converged Ethernet, RoCE) technology is allowed. This technology requires the Ethernet to support lossless transmission. In a conventional load balancing technology, hash routing is performed based on a quintuple of a flow, and one of a plurality of equal-cost paths of a link is randomly selected for forwarding. This is commonly known as static equal-cost multipath (Equal-Cost Multipath, ECMP) routing.

Artificial intelligence (AI) cluster training requires a large amount of distributed parallel computation. Graphics processing unit (GPU) servers need to perform network communication across hosts by using switch fabrics. Model training of AI servers relies on RDMA for network communication.

SUMMARY

According to a first aspect, this application provides a data center network load balancing method. The method is applied to a switch in a data center network and includes the following steps:

obtaining information of a plurality of computing nodes;

determining, based on the information of the plurality of computing nodes, forwarding paths corresponding to the plurality of computing nodes, where the forwarding paths corresponding to the plurality of computing nodes are equal-cost forwarding paths, and the forwarding paths corresponding to the plurality of computing nodes are different from each other; and when receiving a data flow, forwarding the data flow based on a forwarding path corresponding to a target computing node of the data flow.

In a possible design, information of each computing node includes a number of the computing node; and the determining, based on the information of the plurality of computing nodes, the forwarding paths corresponding to the plurality of computing nodes includes:

calculating a remainder obtained by dividing the number of each computing node by a quantity of a plurality of equal-cost forwarding paths; and determining, based on the remainder, a forwarding path corresponding to the computing node from the plurality of equal-cost paths.

According to the foregoing method, because numbers of the computing nodes are different, remainders obtained by dividing the numbers of the computing nodes by the quantity of equal-cost forwarding paths are different, and further, the determined forwarding paths are different. In this way, the plurality of equal-cost forwarding paths are uniformly bound to the numbers of the computing nodes.

In a possible design, the number of each computing node is represented by using an extended attribute of a Border Gateway Protocol (Border Gateway Protocol, BGP) route.

In a possible design, the method further includes:

numbering connected computing nodes in sequence based on a quantity of the connected computing nodes.

In a possible design, information of each computing node further includes an IP address of the computing node; and after the determining, based on the information of the plurality of computing nodes, the forwarding paths corresponding to the plurality of computing nodes, the method further includes:

generating a forwarding entry corresponding to each computing node, where the forwarding entry corresponding to each computing node indicates a correspondence between a forwarding path corresponding to the computing node and the IP address of the computing node.

In a possible design, before the forwarding the data flow based on the forwarding path corresponding to the target computing node of the data flow, the method further includes:

querying the forwarding entry based on an IP address of the target computing node to determine the forwarding path corresponding to the target computing node.

In a possible design, the computing node is an individual computing unit with a server as an individual, or a plurality of computing units with a plurality of GPUs on a server as individuals.

In a possible design, the data center network is a networking architecture with a spine switch and a leaf switch, or a networking architecture with a super spine switch, a spine switch, and a leaf switch.

According to a second aspect, this application further provides a data center network load balancing system. The system is applied to a switch in a data center network and includes:

a leaf switch in a data center network numbers connected computing nodes;

adjacent switches in the data center network synchronize information of a plurality of computing nodes with each other; and a first switch determines, based on the information of the plurality of computing nodes, forwarding paths corresponding to the plurality of computing nodes, where the forwarding paths corresponding to the plurality of computing nodes are equal-cost forwarding paths, the forwarding paths corresponding to the plurality of computing nodes are different from each other, and the first switch is one of the adjacent switches in the data center network, where when receiving a data flow, the first switch forwards the data flow based on a forwarding path corresponding to a target computing node of the data flow.

In a possible design, the determining, by the first switch based on the information of the plurality of computing nodes, the forwarding paths corresponding to the plurality of computing nodes includes:

calculating a remainder obtained by dividing a number of each computing node by a quantity of a plurality of equal-cost forwarding paths; and determining, based on the remainder, a forwarding path corresponding to the computing node from the plurality of equal-cost paths.

According to a third aspect, this application further provides a data center network load balancing apparatus, where the apparatus includes:

a receiving unit, configured to obtain information of a plurality of computing nodes;

a processing unit, configured to determine, based on the information of the plurality of computing nodes, forwarding paths corresponding to the plurality of computing nodes, where the forwarding paths corresponding to the plurality of computing nodes are equal-cost forwarding paths, and the forwarding paths corresponding to the plurality of computing nodes are different from each other; and a sending unit, configured to forward a data flow based on a forwarding path corresponding to a target computing node of the data flow when the data flow is received.

In a possible design, information of each computing node includes a number of the computing node; and the processing unit is configured to: when determining, based on the information of the plurality of computing nodes, the forwarding paths corresponding to the plurality of computing nodes, calculate a remainder obtained by dividing the number of each computing node by a quantity of a plurality of equal-cost forwarding paths; and determine, based on the remainder, a forwarding path corresponding to the computing node from the plurality of equal-cost paths.

According to a fourth aspect, this application further provides a communication device, where the device includes one or more processors and one or more memories, where the one or more memories store one or more programs, and when the programs are executed by the one or more processors, the device is enabled to perform the method according to the first aspect or the second aspect.

According to a fifth aspect, this application further provides a data center network load balancing method. The method is applied to a communication device in a data center network and includes the following steps:

obtaining information of a plurality of computing nodes;

determining, based on the information of the plurality of computing nodes, forwarding paths corresponding to the plurality of computing nodes, where the forwarding paths corresponding to the plurality of computing nodes are equal-cost forwarding paths, and the forwarding paths corresponding to the plurality of computing nodes are different from each other; and when receiving a data flow, forwarding the data flow based on a forwarding path corresponding to a target computing node of the data flow.

In a possible design, information of each computing node includes a number of the computing node; and the determining, based on the information of the plurality of computing nodes, the forwarding paths corresponding to the plurality of computing nodes includes:

calculating a remainder obtained by dividing the number of each computing node by a quantity of a plurality of equal-cost forwarding paths; and determining, based on the remainder, a forwarding path corresponding to the computing node from the plurality of equal-cost paths.

In a possible design, the number of each computing node is represented by using an extended attribute of a Border Gateway Protocol BGP route.

In a possible design, the method further includes:

numbering a plurality of connected computing nodes in sequence based on a quantity of the plurality of connected computing nodes.

In a possible design, information of each computing node includes an Internet Protocol IP address or a Media Access Control MAC address of the computing node; and after the determining, based on the information of the plurality of computing nodes, the forwarding paths corresponding to the plurality of computing nodes, the method further includes:

generating a forwarding entry corresponding to each computing node, where the forwarding entry corresponding to each computing node indicates a correspondence between a forwarding path corresponding to the computing node and the IP address of the computing node.

In a possible design, before the forwarding the data flow based on the forwarding path corresponding to the target computing node of the data flow, the method further includes:

querying the forwarding entry based on an IP address or a MAC address of the target computing node to determine the forwarding path corresponding to the target computing node.

In a possible design, the computing node is an individual computing unit with a server as an individual, or a plurality of computing units with a plurality of GPUs on a server as individuals.

In a possible design, the data center network is a networking architecture with a spine switch and a leaf switch, or a networking architecture with a super spine switch, a spine switch, and a leaf switch.

According to a sixth aspect, this application further provides a data center network load balancing system, including:

a leaf switch in a data center network, configured to number connected computing nodes;

adjacent switches in the data center network, configured to synchronize information of a plurality of computing nodes with each other; and a first switch, configured to determine, based on the information of the plurality of computing nodes, forwarding paths corresponding to the plurality of computing nodes, where the forwarding paths corresponding to the plurality of computing nodes are equal-cost forwarding paths, the forwarding paths corresponding to the plurality of computing nodes are different from each other, and the first switch is one of the adjacent switches in the data center network, where when the first switch receives a data flow, the first switch is further configured to forward the data flow based on a forwarding path corresponding to a target computing node of the data flow.

In a possible design, the first switch is configured to: calculate a remainder obtained by dividing a number of each computing node by a quantity of a plurality of equal-cost forwarding paths; and determine, based on the remainder, a forwarding path corresponding to the computing node from the plurality of equal-cost paths.

In a possible design, information of each computing node further includes an IP address or a MAC address of the computing node; and after the determining, based on the information of the plurality of computing nodes, the forwarding paths corresponding to the plurality of computing nodes, the system further includes:

generating a forwarding entry corresponding to each computing node, where the forwarding entry corresponding to each computing node indicates a correspondence between a forwarding path corresponding to the computing node and the IP address or the MAC address of the computing node.

In a possible design, before the forwarding the data flow based on the forwarding path corresponding to the target computing node of the data flow, the system further includes:

querying the forwarding entry based on an IP address or a MAC address of the target computing node to determine the forwarding path corresponding to the target computing node.

According to a seventh aspect, this application further provides a data center network load balancing apparatus, including:

a receiving unit, configured to obtain information of a plurality of computing nodes;

a processing unit, configured to determine, based on the information of the plurality of computing nodes, forwarding paths corresponding to the plurality of computing nodes, where the forwarding paths corresponding to the plurality of computing nodes are equal-cost forwarding paths, and the forwarding paths corresponding to the plurality of computing nodes are different from each other; and a sending unit, configured to forward a data flow based on a forwarding path corresponding to a target computing node of the data flow when the data flow is received.

In a possible design, information of each computing node includes a number of the computing node; and the processing unit is configured to: when determining, based on the information of the plurality of computing nodes, the forwarding paths corresponding to the plurality of computing nodes, calculate a remainder obtained by dividing the number of each computing node by a quantity of a plurality of equal-cost forwarding paths; and determine, based on the remainder, a forwarding path corresponding to the computing node from the plurality of equal-cost paths.

In a possible design, information of each computing node further includes an IP address or a MAC address of the computing node; and after the determining, based on the information of the plurality of computing nodes, the forwarding paths corresponding to the plurality of computing nodes, the apparatus further includes:

generating a forwarding entry corresponding to each computing node, where the forwarding entry corresponding to each computing node indicates a correspondence between a forwarding path corresponding to the computing node and the IP address of the computing node.

In a possible design, before the forwarding the data flow based on the forwarding path corresponding to the target computing node of the data flow, the apparatus further includes:

querying the forwarding entry based on an IP address of the target computing node to determine the forwarding path corresponding to the target computing node.

According to an eighth aspect, this application further provides a computer-readable storage medium, where the computer-readable storage medium stores computer-executable instructions, and when executed by a processor, the computer-executable instructions are used to implement the method according to the fifth aspect or the sixth aspect.

According to a ninth aspect, this application further provides a computer program product, including a computer program, where when executed by a processor, the computer program implements the method according to the fifth aspect or the sixth aspect.

BRIEF DESCRIPTION OF DRAWINGS

To describe the technical solutions in the embodiments of this application more clearly, the following briefly describes the accompanying drawings required for describing the embodiments. Apparently, the accompanying drawings in the following description show merely some embodiments of this application, and a person of ordinary skill in the art may still derive other drawings from these accompanying drawings without creative efforts.

FIG. 5 is a schematic flowchart of a data center network load balancing method according to an embodiment of this application.

FIG. 8 is a schematic flowchart of a data center network load balancing system according to an embodiment of this application.

FIG. 9 is a first schematic diagram of a structure of a data center network load balancing apparatus according to an embodiment of this application.

DESCRIPTION OF EMBODIMENTS

Figure 1:
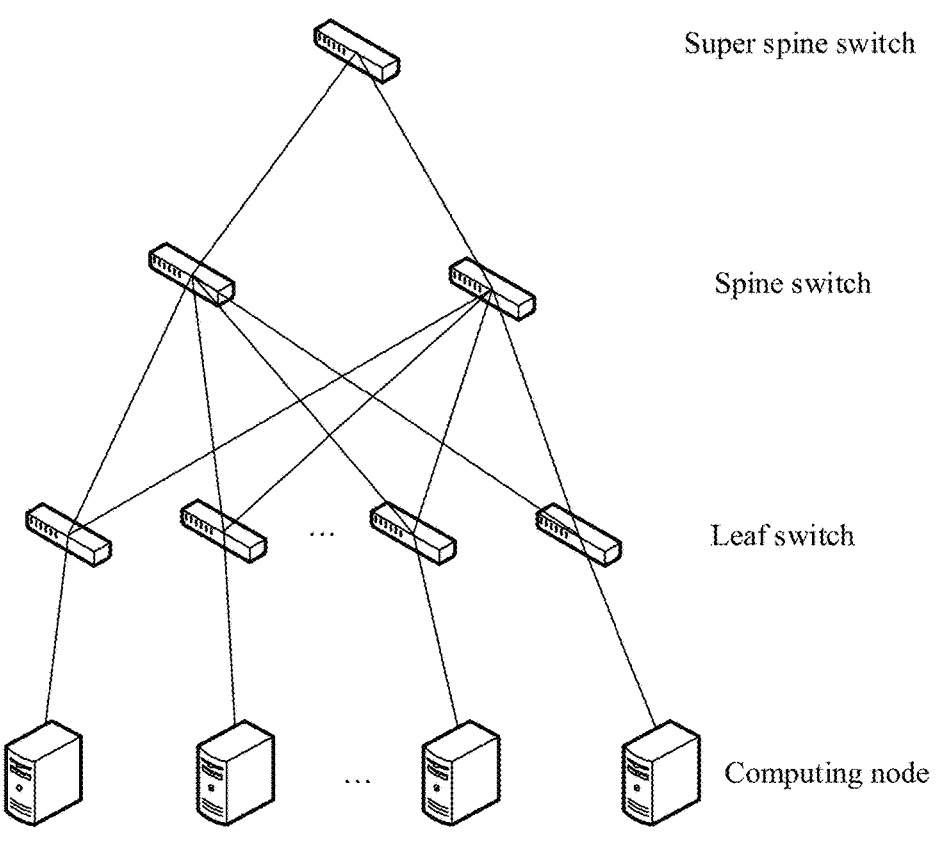
FIG. 1 is a schematic diagram of an architecture of a data center network according to an embodiment of this application.

To make the objectives, technical solutions, and advantages of this application clearer, the following further describes this application in detail with reference to the accompanying drawings. Apparently, the described embodiments are some but not all of the embodiments of this application. All other embodiments obtained by a person of ordinary skill in the art based on the embodiments of this application without creative efforts shall fall within the protection scope of this application.

An application scenario described in the embodiments of this application is intended to describe the technical solutions in the embodiments of this application more clearly, and does not constitute any limitation on the technical solutions provided in the embodiments of this application. A person of ordinary skill in the art may know that, with emergence of a new application scenario, the technical solutions provided in the embodiments of this application are also applicable to a similar technical problem. In the description of this application, unless otherwise specified, "a plurality of" means two or more.

In this application, use of ordinal terms such as "first" and "second" to modify elements does not indicate any priority, precedence, or order of one element relative to another element, or a time sequence of actions performed in a method. Unless otherwise specially stated, such ordinal terms are used only as labels to distinguish one element with a particular name from another element with the same name (except for the ordinal terms).

In a case that the terms "comprise", "have", and "include" described in this application are used, another component may also be added unless a definite restrictive term such as "only", or "consist of" is used. Unless otherwise mentioned, a term in a singular form may cover a plural form, and a quantity thereof cannot be understood as only one.

Conventional load balancing technologies mainly include a network-based balanced packet switching technology, a network interface card (Network Interface Card, NIC)-based balanced packet switching technology, and static ECMP.

A principle of the network-based balanced packet switching technology is as follows: A switch breaks down packets in an elephant flow into small data packets or network slices, where the elephant flow is a data flow with a large single-flow bandwidth. The small data packets or network slices are uniformly forwarded to a plurality of equal-cost path egresses of the switch, and the small data packets or network slices are reassembled at a switch egress. The network-based balanced packet switching technology can make data flows uniformly distributed to the greatest extent, thereby avoiding link congestion. However, a packet disorder may occur, and an order of arrival of a data flow delivered to a destination address cannot be ensured.

A principle of the NIC-based balanced packet switching technology is similar to the principle of the network-based balanced packet switching technology, and a difference lies in that the NIC-based balanced packet switching technology performs packet reassembly at a server NIC rather than a switch egress, but a packet disorder may also occur.

The static ECMP is to perform hash routing based on a quintuple of a flow and randomly select one of a plurality of equal-cost paths for forwarding. For general computing scenarios with dense and randomly distributed large and small flows, a load balancing effect of the static ECMP is still ideal. However, in AI cluster training scenarios, most flows in RDMA communication are elephant flows. When a bandwidth of a flow at a switch ingress is greater than a bandwidth of a flow at a switch egress, network congestion may be caused in the switch. A switch buffer can handle temporary congestion, but when the congestion is excessively long, the switch buffer may be overloaded, and a next new data packet received by the switch will be discarded.

Both an explicit congestion notification (Explicit Congestion Notification, ECN) algorithm and priority-based flow control (Priority-based Flow Control, PFC) are to make passive responses to the foregoing network overload of the switch. The ECN displays a congestion marker by determining congestion of the switch. A host sending a data flow detects the congestion based on a packet returned from the network and carrying a congestion marker. In this case, a packet loss may be reduced by reducing a data flow sent to the switch with the congestion marker or by sending a data flow with a small single-flow bandwidth. A main principle of PFC is as follows: If the switch detects congestion, the switch actively sends a message to an upstream device of the switch, requesting the upstream device to suspend sending of the data flow and wait for a period of time before continuing to send the data flow. This can meet a requirement for no packet loss.

A data center network applied in an embodiment of this application uses a CLOS architecture for interconnection. The architecture was proposed by a man named Charles Clos at Bell Labs, and therefore is named the CLOS architecture. The CLOS architecture relies on RDMA for network communication and can provide a non-blocking network. Common CLOS architectures include a two-layer CLOS architecture and a three-layer CLOS architecture. The two-layer CLOS architecture includes leaf (Leaf) switches and spine (Spine) switches. As shown in FIG. 1, the three-layer CLOS architecture includes leaf switches, spine switches, and a super spine switch, where the leaf switches may be referred to as LEs, the spine switches may be referred to as SPs, and the super spine switch may be referred to as an SSP.

For example, the data center network in this application is a networking architecture with a spine switch and a leaf switch, or a networking architecture with a super spine switch, a spine switch, and a leaf switch. With development of network technologies, an architecture of the data center network of this application may be expanded to a four-layer CLOS architecture, a five-layer CLOS architecture, or the like. This application does not elaborate on this.

For example, a leaf switch has 128 interfaces. Similarly, a spine switch and a super spine switch both have 128 interfaces. In the leaf switch, 64 interfaces are used for downlink and computing node connections, and remaining 64 interfaces are used for uplink and spine switch connections. In the spine switch, 64 interfaces are used for downlink and leaf switch connections, and remaining 64 interfaces are used for uplink and super spine switch connections. All the 128 interfaces of the super spine switch are used for downlink and spine switch connections.

Figure 2:
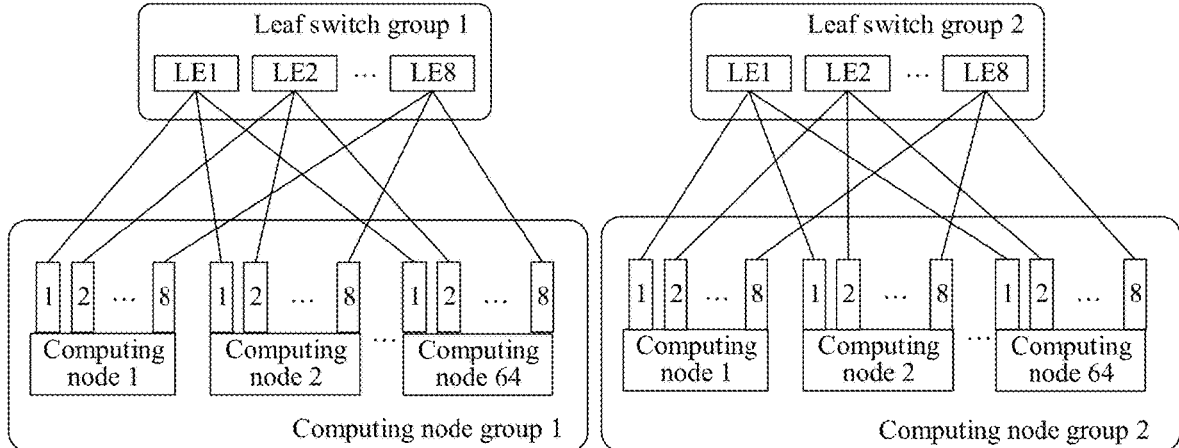
FIG. 2 is a schematic diagram of connection rules between computing nodes and leaf switches in a data center network load balancing method according to an embodiment of this application.

Connection rules between computing nodes, leaf switches, spine switches, and super spine switches are as follows:

(1) Connection rules between computing nodes and leaf switches are as follows: A $j^{th}$ GPU port in computing node group i can be connected to a $j^{th}$ leaf switch in leaf switch group i, where i and j are both positive integers. As shown in FIG. 2, there are two groups of computing nodes, each group has 64 computing nodes, numbered 1 to 64, and each computing node has 8 GPU ports, numbered 1 to 8. GPU port 1 of each of computing node 1 to computing node 64 in computing node group 1 can be connected to LE 1 in leaf switch group 1, GPU port 2 of each of computing node 1 to computing node 64 in computing node group 1 can be connected to LE 2 in leaf switch group 1, . . . , GPU port 8 of each of computing node 1 to computing node 64 in computing node group 1 can be connected to LE 8 in leaf switch group 1. Similarly, GPU port 1 of each of computing node 1 to computing node 64 in computing node group 2 can be connected to LE 1 in leaf switch group 2, GPU port 2 of each of computing node 1 to computing node 64 in computing node group 2 can be connected to LE 2 in leaf switch group 2, . . . , GPU port 8 of each of computing node 1 to computing node 64 in computing node group 2 can be connected to LE 8 in leaf switch group 2.

Figure 3:
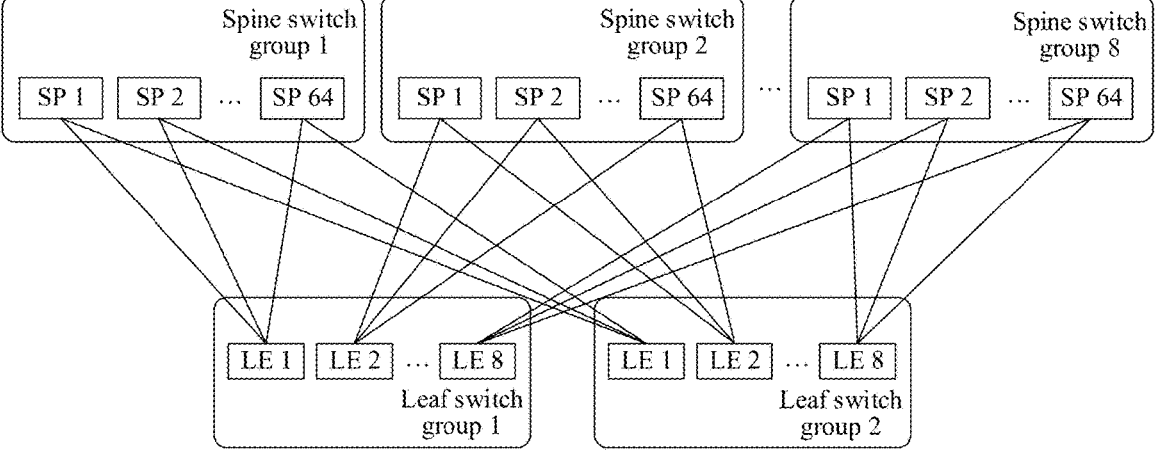
FIG. 3 is a schematic diagram of connection rules between leaf switches and spine switches in a data center network load balancing method according to an embodiment of this application.

(2) Connection rules between leaf switches and spine switches are as follows: A $p^{th}$ switch in a leaf switch group can be connected to any spine switch in spine switch group p, where p is a positive integer. As shown in FIG. 3, there are two groups of leaf switches, where each group has 8 leaf switches, numbered 1 to 8; and there are eight groups of spine switches, where each group has 64 spine switches, numbered 1 to 64. LE 1 in leaf switch group 1 can be connected to any spine switch from SP 1 to SP 64 in spine switch group 1, LE 2 in leaf switch group 1 can be connected to any spine switch from SP 1 to SP 64 in spine switch group 2, . . . , LE 8 in leaf switch group 1 can be connected to any spine switch from SP 1 to SP 64 in spine switch group 8. Similarly, LE 1 in leaf switch group 2 can be connected to any spine switch from SP 1 to SP 64 in spine switch group 1, LE 2 in leaf switch group 2 can be connected to any spine switch from SP 1 to SP 64 in spine switch group 2, . . . , LE 8 in leaf switch group 2 can be connected to any spine switch from SP 1 to SP 64 in spine switch group 8.

Figure 4:
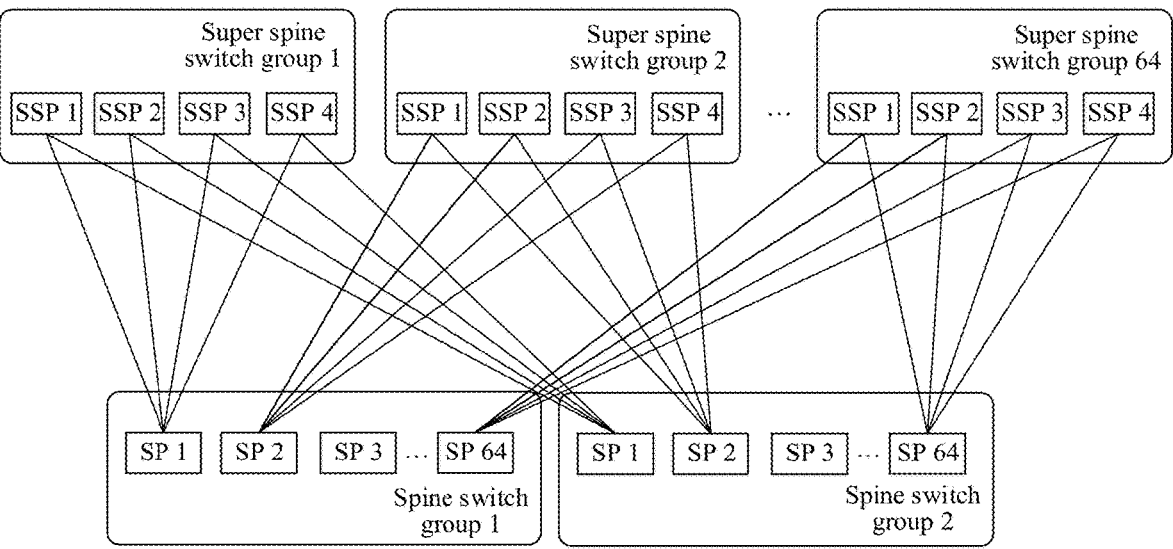
FIG. 4 is a schematic diagram of connection rules between spine switches and super spine switches in a data center network load balancing method according to an embodiment of this application.

(3) Connection rules between spine switches and super spine switches are as follows: A $t^{th}$ spine switch in a spine switch group can be connected to any super spine switch in super spine switch group t, where t is a positive integer. As shown in FIG. 4, there are two groups of spine switches, where each group has 64 spine switches, numbered 1 to 64; and there are 64 groups of super spine switches, where each group has 4 super spine switches, numbered 1 to 4. SP 1 in spine switch group 1 can be connected to any super spine switch from SSP 1 to SSP 4 in super spine switch group 1, SP 2 in spine switch group 1 can be connected to any super spine switch from SSP 1 to SSP 4 in super spine switch group 2, . . . , SP 64 in spine switch group 1 can be connected to any super spine switch from SSP 1 to SSP 4 in super spine switch group 64. Similarly, SP 1 in spine switch group 2 can be connected to any super spine switch from SSP 1 to SSP 4 in super spine switch group 1, SP 2 in spine switch group 2 can be connected to any super spine switch from SSP 1 to SSP 4 in super spine switch group 2, . . . , SP 64 in spine switch group 2 can be connected to any super spine switch from SSP 1 to SSP 4 in super spine switch group 64.

Based on the foregoing problem of a static ECMP fault in the AI cluster training scenarios and the data center network, this application provides a data center network load balancing method to achieve uniform distribution of data flows on all paths. It may be understood that the following method may be performed by any switch in a data center network, for example, a leaf switch, a spine switch, or a super spine switch shown in FIG. 1.

As shown in FIG. 5, the method includes the following steps.

Step 500: Obtain information of a plurality of computing nodes.

For example, information of each computing node includes a number of the computing node. Each leaf switch in the data center network numbers connected computing nodes in sequence based on a quantity of computing nodes connected to the leaf switch. The computing node is an individual computing unit with a server as an individual, or a plurality of computing units with a plurality of GPUs on a server as individuals. As described above, because a leaf switch has a maximum of 64 interfaces for connecting computing nodes, a maximum of 64 computing nodes can be connected to the leaf switch.

Figure 6:
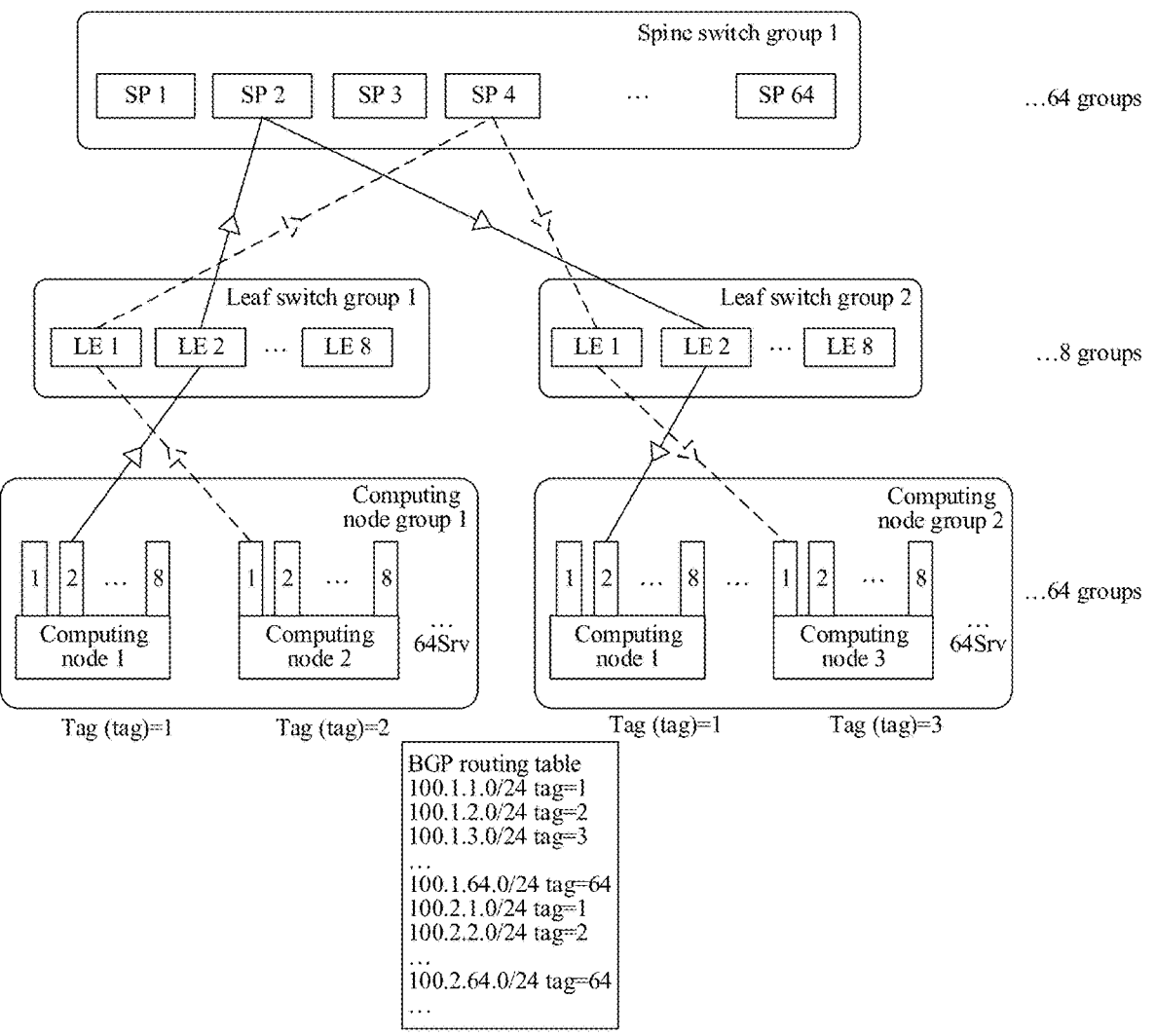
FIG. 6 is a schematic diagram of path forwarding in a data center network load balancing method in a communication scenario of GPUs with a same number according to an embodiment of this application.

For example, as shown in FIG. 6, 64 computing nodes in computing node group 1 that are connected to LE 1 in leaf node group 1 are numbered as follows: Computing node 1 in computing node group 1 is numbered 1, computing node 2 in computing node group 1 is numbered 2, . . . , computing node 64 in computing node group 1 is numbered 64; or computing node 1 in computing node group 1 is numbered 0, computing node 2 in computing node group 1 is numbered 1, . . . , computing node 64 in computing node group 1 is numbered 63. This is not limited in this application.

Similarly, 64 computing nodes in computing node group 2 that are connected to LE 1 in leaf node group 2 are numbered as follows: Computing node 1 in computing node group 2 is numbered 1, computing node 2 in computing node group 2 is numbered 2, . . . , computing node 64 in computing node group 2 is numbered 64.

For example, each adjacent switch in the data center network obtains information of a plurality of computing nodes through a BGP route advertisement. The number of each computing node is represented by using an extended attribute of a BGP route. The extended attribute of the BGP route may be represented by a tag (tag), and a value of the tag is the number of the computing node.

For example, leaf switch 1 has information of a plurality of computing nodes: computing node information ①, computing node information ②, and computing node information ③; and spine switch 1 connected to leaf switch 1 has information of a plurality of computing nodes: computing node information ④, computing node information ⑤, and computing node information ⑥. Each adjacent switch obtains information of a plurality of computing nodes through a BGP route advertisement, that is, leaf switch 1 may synchronize computing node information ①, computing node information ②, and computing node information ③ to spine switch 1 through a BGP route advertisement, and spine switch 1 may also synchronize computing node information ④, computing node information ⑤, and computing node information ⑥ to leaf switch 1 through a BGP route advertisement. Similarly, adjacent spine switches and super spine switches may also synchronize information of a plurality of computing nodes to each other through BGP route advertisements. From the foregoing connection rules between spine switches and super spine switches, it can be learned that one spine switch is connected to a maximum of four super spine switches. In this case, the spine switch synchronizes information of a plurality of computing nodes to the four connected super spine switches through a BGP route advertisement, and each super spine switch may also synchronize information of a plurality of computing nodes to the spine switch.

For example, the information of each computing node further includes an IP address of the computing node. Each node in the network has a unique IP address. The IP address includes a 32-bit binary number, usually represented as four decimal numbers. Each decimal number ranges from 0 to 255, and each decimal number is separated by ".". For example, 128.1.1.4 and 100.2.1.3 are both IP addresses.

For example, an IP address includes two parts: a network segment address and a host address. 128.1.1.4/24 means that first 24 bits are a network segment address and last 8 bits are a host address. 128.1.1.4/8 means that first 8 bits are a network segment address and last 24 bits are a host address. The number after "/" may be referred to as a subnet mask. In this application, the subnet mask is 24.

Step 510: Determine, based on the information of the plurality of computing nodes, forwarding paths corresponding to the plurality of computing nodes, where the forwarding paths corresponding to the plurality of computing nodes are equal-cost forwarding paths, and the forwarding paths corresponding to the plurality of computing nodes are different from each other.

For example, the equal-cost forwarding paths are equal-cost multipath ECMP routes, where the equal-cost multipath ECMP routes are paths with a same cost from a switch to a next-hop switch of the switch.

In the following description, it is assumed that a current switch is referred to as a first switch and that a next-hop switch of the switch is referred to as a second switch.

As shown in FIG. 6, it is assumed that the first switch is LE1 in leaf switch group 1, and that the second switch belongs to a spine layer, and that a quantity M of interfaces of a spine switch that may be connected to leaf switches is 64; there are 64 groups of leaf switches in total, where each group has one LE 1, there are 64 LEs 1 at a leaf layer, and N is assumed to be 64; from the foregoing connection rules between leaf switches and spine switches, it can be learned that LE 1 in leaf switch group 1 may be connected to any spine switch from SP 1 to SP 64 in spine switch group 1, that is, at a layer to which the second switch belongs, a quantity K of switches that may be connected to the first switch is 64. Therefore, a quantity of equal-cost forwarding paths determined by the first switch LE 1 is M/N*K=64/64*64=64, respectively as follows: path 1: LE 1 in leaf switch group 1–>SP 1 in spine switch group 1; path 2: LE 1 in leaf switch group 1–>SP 2 in spine switch group 1; path 3: LE 1 in leaf switch group 1–>SP 3 in spine switch group 1; . . . ; path 64: LE 1 in leaf switch group 1–>SP 64 in spine switch group 1. A cost of LE 1 selecting any one of the 64 equal-cost forwarding paths to the second switch is the same.

In a possible implementation, when the forwarding paths corresponding to the plurality of computing nodes are determined based on the information of the plurality of computing nodes, a remainder obtained by dividing the number of each computing node by a quantity of equal-cost forwarding paths is calculated, and a forwarding path corresponding to the computing node is determined from the plurality of equal-cost forwarding paths based on the remainder. Because numbers of the computing nodes included in the information of the computing nodes are different, remainders obtained by dividing the numbers of the computing nodes by the quantity of equal-cost forwarding paths are different, and further, the forwarding paths determined based on the remainders are different. In this way, the forwarding paths are uniformly bound to the numbers of the computing nodes.

Example 1: The first switch directly determines, based on the remainder, a forwarding path corresponding to the computing node from the equal-cost forwarding paths. For example, assuming that the quantity of equal-cost forwarding paths is 10, the forwarding path is determined based on the remainder obtained by dividing the number of each computing node by the quantity of equal-cost forwarding paths. If the remainder is 0, it indicates that the first path of the equal-cost forwarding paths is determined as the forwarding path; if the remainder is 1, it indicates that the second path of the equal-cost forwarding paths is determined as the forwarding path; . . . ; if the remainder is 9, it indicates that the tenth path of the equal-cost forwarding paths is determined as the forwarding path.

Example 2: The first switch determines, based on a sum of the remainder and a preset value, a forwarding path corresponding to the computing node from the plurality of equal-cost paths.

For example, assuming that the quantity of equal-cost forwarding paths is 10 and that the preset value is 2, if the remainder is 0, the sum of the remainder and the preset value is 2, indicating that the first path of the plurality of equal-cost forwarding paths is determined as the forwarding path; if the remainder is 1, the sum of the remainder and the preset value is 3, indicating that the second path of the plurality of equal-cost forwarding paths is determined as the forwarding path; . . . ; if the remainder is 9, the sum of the remainder and the preset value is 11, indicating that the tenth path of the plurality of equal-cost forwarding paths is determined as the forwarding path.

Example 3: The first switch determines, based on a difference between the total quantity of the plurality of equal-cost forwarding paths and the remainder, a forwarding path corresponding to the computing node from the plurality of equal-cost paths.

For example, assuming that the quantity of equal-cost forwarding paths is 10, if the remainder is 0, the difference between the total quantity of equal-cost forwarding paths and the remainder is 10, indicating that the tenth path of the plurality of equal-cost forwarding paths is determined as the forwarding path; if the remainder is 1, the difference between the total quantity of equal-cost forwarding paths and the remainder is 9, indicating that the ninth path of the plurality of equal-cost forwarding paths is determined as the forwarding path; . . . ; if the remainder is 9, the difference between the total quantity of equal-cost forwarding paths and the remainder is 1, indicating that the first path of the equal-cost forwarding paths is determined as the forwarding path.

It may be understood that the foregoing examples 1 to 3 are for illustrative purposes only. This application is not limited thereto.

Further, for example, after the forwarding paths corresponding to the plurality of computing nodes are determined based on the information of the plurality of computing nodes, a forwarding entry corresponding to each computing node is generated, where the forwarding entry corresponding to each computing node indicates a correspondence between a forwarding path corresponding to the computing node and the IP address of the computing node.

Example 1: Assuming that the first switch is LE 1 in leaf switch group 1 in FIG. 6, it can be learned from the above that the quantity of equal-cost forwarding paths determined by LE 1 in leaf switch group 1 is 64, respectively as follows: path 1: LE 1 in leaf switch group 1–>SP 1 in spine switch group 1; path 2: LE 1 in leaf switch group 1–>SP 2 in spine switch group 1; path 3: LE 1 in leaf switch group 1–>SP 3 in spine switch group 1; . . . ; path 64: LE 1 in leaf switch group 1–>SP 64 in spine switch group 1. LE 1 in leaf switch group 1 determines, based on a remainder 1 obtained by dividing a tag value 1 in computing node information ① by the quantity 64 of equal-cost forwarding paths, that its forwarding path is path 2, that is, LE 1 in leaf switch group 1–>SP 2 in spine switch group 1, and generates a forwarding entry including 100.1.1.0/24 tag=1 SP 2 in spine switch group 1; similarly, determines, based on a remainder 2 obtained by dividing a tag value 2 in computing node information ② by the quantity 64 of equal-cost forwarding paths, that its forwarding path is path 3, that is, LE 1 in leaf switch group 1–>SP 3 in spine switch group 1, and generates a forwarding entry including 100.1.2.0/24 tag=2 SP 3 in spine switch group 1; determines, based on a tag value 3 in computing node information ③, that its forwarding path is path 4, that is, LE 1 in leaf switch group 1–>SP 4 in spine switch group 1, and generates a forwarding entry including 100.1.3.0/24 tag=3 SP 4 in spine switch group 1; . . . , and so on. LE 1 in leaf switch group 1 may generate a forwarding entry corresponding to each computing node.

Example 2: Assuming that the first switch is LE 2 in leaf switch group 1 in FIG. 6, it can be learned from the above that the quantity of equal-cost forwarding paths determined by LE 2 in leaf switch group 1 is 64, respectively as follows: path 1: LE 2 in leaf switch group 1–>SP 1 in spine switch group 1; path 2: LE 2 in leaf switch group 1–>SP 2 in spine switch group 1; path 3: LE 2 in leaf switch group 1–>SP 3 in spine switch group 1; . . . ; path 64: LE 2 in leaf switch group 1–>SP 64 in spine switch group 1. LE 2 in leaf switch group 1 generates, based on computing node information ①, a forwarding entry including 100.1.1.0/24 tag=1 SP 2 in spine switch group 1; similarly, generates, based on computing node information ②, a forwarding entry including 100.1.2.0/24 tag=2 SP 3 in spine switch group 1; generates, based on computing node information ③, a forwarding entry including 100.1.3.0/24 tag=3 SP 4 in spine switch group 1; . . . , and so on. LE 2 in leaf switch group 1 may generate a forwarding entry corresponding to each computing node.

Example 3: Assuming that the first switch is SP 4 in spine switch group 1 in FIG. 7, it can be learned from the above that the quantity of equal-cost forwarding paths determined by SP 4 in spine switch group 1 is 64, respectively as follows: path 1: SP 4 in spine switch group 1–>interface 1 of SSP 1 in super spine switch group 4; path 2: SP 4 in spine switch group 1–>interface 2 of SSP 1 in super spine switch group 4; . . . ; path 17: SP 4 in spine switch group 1–>interface 1 of SSP 2 in super spine switch group 4; path 18: SP 4 in spine switch group 1–>interface 2 of SSP 2 in super spine switch group 4; . . . ; path 64: SP 4 in spine switch group 1–>interface 16 of SSP 4 in super spine switch group 4. SP 4 in spine switch group 1 generates, based on computing node information ①, a forwarding entry including 100.1.1.0/24 tag=1 SSP 1 in super spine switch group 4; generates, based on computing node information ②, a forwarding entry including 100.1.2.0/24 tag=2 SSP 1 in super spine switch group 4; generates, based on computing node information ③, a forwarding entry including 100.1.3.0/24 tag=3 SSP 1 in super spine switch group 4; . . . ; generates, based on computing node information ⑰, a forwarding entry including 100.1.17.0/24 tag=1 SSP 2 in super spine switch group 4; . . . ; and so on. SP 4 in spine switch group 1 may generate a forwarding entry corresponding to each computing node.

Step 520: When receiving a data flow, forward the data flow based on a forwarding path corresponding to a target computing node of the data flow.

For example, before the data flow is forwarded based on the forwarding path corresponding to the target computing node of the data flow, the forwarding path corresponding to the target computing node is determined by querying a forwarding entry based on an IP address of the target computing node, and the data flow is forwarded based on the forwarding path corresponding to the IP address of the target computing node.

Example 1: Using data flow 1 represented by a solid line in FIG. 6 as an example, GPU port 2 of computing node 1 in computing node group 1 transmits data to GPU port 2 of computing node 1 in computing node group 2. In this case, a starting computing node is computing node 1 in computing node group 1, and a target computing node is computing node 1 in computing node group 2, where an IP address of computing node 1 in computing node group 2 is 100.2.1.2.

According to the foregoing connection rules between computing nodes and leaf switches, it can be learned that GPU port 2 of computing node 1 in computing node group 1 forwards the data flow to LE 2 in leaf switch group 1. When LE 2 in leaf switch group 1 receives the data flow sent from GPU port 2 of computing node 1 in computing node group 1, LE 2 in leaf switch group 1 queries a forwarding entry based on the IP address 100.2.1.2 of the target computing node, and the matched forwarding entry is: 100.2.1.0/24 tag=1 SP 2 in spine switch group 1. Therefore, the determined forwarding path is: LE 2 in leaf switch group 1–>SP 2 in spine switch group 1, that is, LE 2 in leaf switch group 1 forwards the data flow to SP 2 in spine switch group 1. According to the foregoing connection rules between computing nodes and leaf switches, it can be learned that GPU port 2 of computing node 1 in computing node group 2 can be connected to LE 2 in leaf switch group 2. Therefore, SP 2 in spine switch group 1 forwards data flow 1 to LE 2 in leaf switch group 2, and then LE 2 in leaf switch group 2 forwards the data flow to the target computing node. Therefore, a complete forwarding path of data flow 1 represented by the solid line in FIG. 6 is: GPU port 2 of computing node 1 in computing node group 1–>LE 2 in leaf switch group 1–>SP 2 in spine switch group 1–>LE 2 in leaf switch group 2–>GPU port 2 of computing node 1 in computing node group 2.

Example 2: Using data flow 2 represented by a dashed line in FIG. 6 as an example, GPU port 1 of computing node 2 in computing node group 1 transmits data to GPU port 1 of computing node 3 in computing node group 2. In this case, a starting computing node is computing node 2 in computing node group 1, and a target computing node is computing node 3 in computing node group 2, where an IP address of computing node 3 in computing node group 2 is 100.2.3.2.

According to the foregoing connection rules between computing nodes and leaf switches, it can be learned that GPU port 1 of computing node 2 in computing node group 1 forwards the data flow to LE 1 in leaf switch group 1. When LE 1 in leaf switch group 1 receives the data flow sent from GPU port 1 of computing node 2 in computing node group 1, LE 1 in leaf switch group 1 queries a forwarding entry based on the IP address 100.2.3.2 of the target computing node, and the matched forwarding entry is: 100.2.3.2/24 tag=3 SP 4 in spine switch group 1. Therefore, the determined forwarding path is: LE 1 in leaf switch group 1–>SP 4 in spine switch group 1, that is, LE 1 in leaf switch group 1 forwards the data flow to SP 4 in spine switch group 1. According to the foregoing rules between computing nodes and leaf switches, it can be learned that GPU port 1 of computing node 3 in computing node group 2 can be connected to LE 1 in leaf switch group 2. Therefore, SP 4 in spine switch group 1 forwards data flow 2 to LE 1 in leaf switch group 2, and then LE 1 in leaf switch group 2 forwards the data flow to the target computing node. Therefore, a complete forwarding path of data flow 2 represented by the dashed line in FIG. 6 is: GPU port 1 of computing node 2 in computing node group 1–>LE 1 in leaf switch group 1–>SP 4 in spine switch group 1–>LE 1 in leaf switch group 2–>GPU port 1 of computing node 3 in computing node group 2.

Example 3: Using a data flow represented in FIG. 7 as an example, GPU port 1 of computing node 2 in computing node group 1 transmits data to GPU port 2 of computing node 3 in computing node group 2. In this case, a starting computing node is computing node 2 in computing node group 1, and a target computing node is computing node 3 in computing node group 2, where an IP address of computing node 3 in computing node group 2 is 100.2.3.2.

After LE 1 in leaf switch group 1 forwards the data flow to SP 4 in spine switch group 1, SP 4 in spine switch group 1 queries a forwarding entry based on the IP address 100.2.3.2 of the target computing node, and the matched forwarding entry is: 100.2.3.2/24 tag=3 SSP 1 in super spine switch group 4. Therefore, the determined forwarding path is: SP 4 in spine switch group 1–>SSP 1 in super spine switch group 4, that is, SP 4 in spine switch group 1 forwards the data flow to SSP 1 in super spine switch group 4. According to the foregoing connection rules between computing nodes and leaf switches, it can be learned that GPU port 2 of computing node 3 in computing node group 2 can communicate with LE 2 in leaf switch group 2. Therefore, a forwarding node next to SSP 1 in super spine switch group 4 belongs to spine switch group 2. Because SSP 1 in super spine switch group 4 communicates with SP 4 at an SP layer, it is further determined that the next forwarding node is SP 4 in spine switch group 2. Therefore, SSP 1 in super spine switch group 4 forwards the data flow to SP 4 in spine switch group 2. According to the foregoing connection rules between computing nodes and leaf switches, it can be learned that GPU port 2 of computing node 3 in computing node group 2 can be connected to LE 2 in leaf switch group 2. Therefore, SP 4 in spine switch group 2 forwards the data flow to LE 2 in leaf switch group 2, and finally, LE 2 in leaf switch group 2 forwards the data flow to the target computing node.

Figure 7:
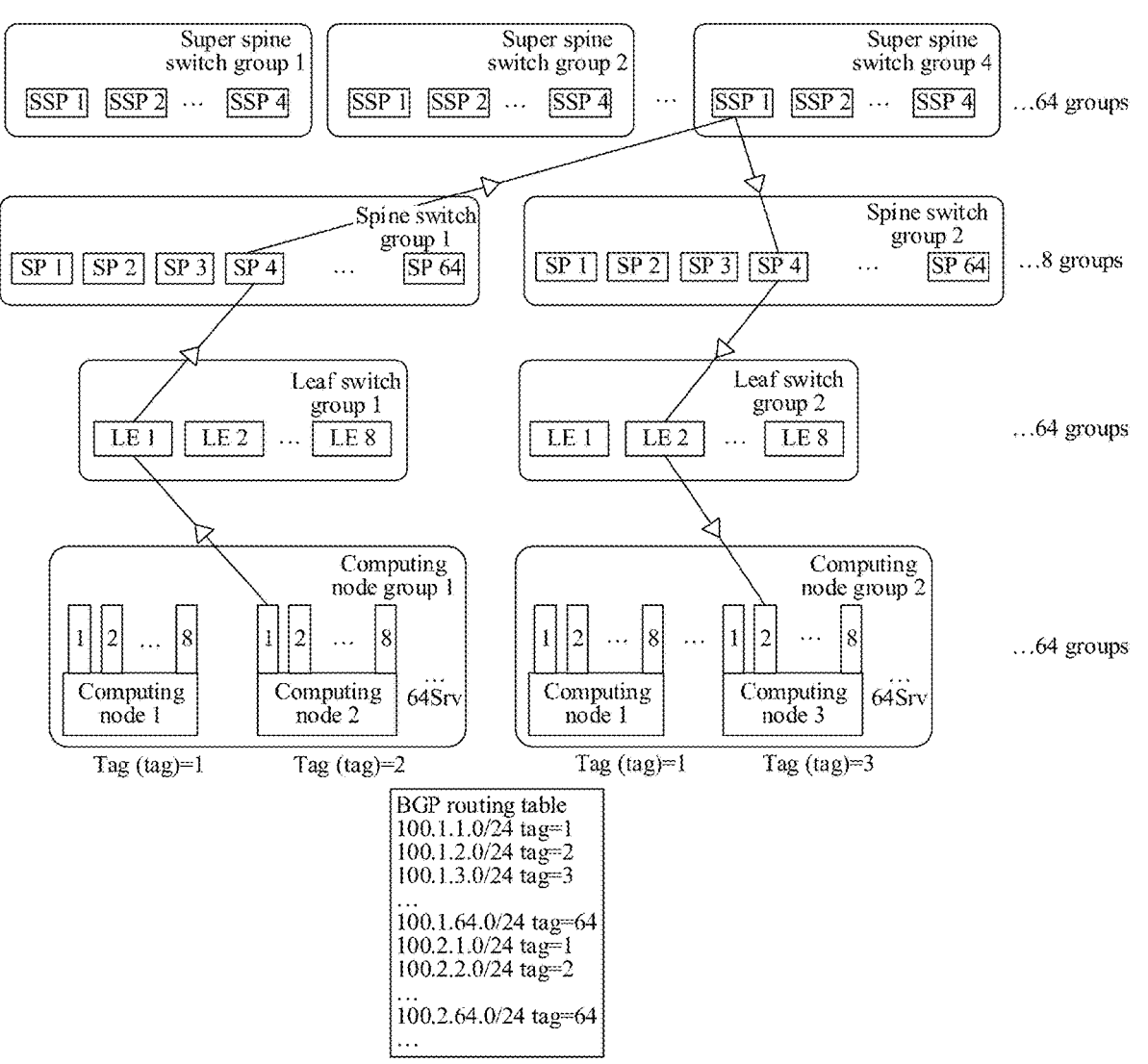
FIG. 7 is a schematic diagram of path forwarding in a data center network load balancing method in a communication scenario of GPUs with different numbers according to an embodiment of this application.

Therefore, a complete forwarding path of the data flow represented in FIG. 7 is: GPU port 1 of computing node 2 in computing node group 1–>LE 1 in leaf switch group 1–>SP 4 in spine switch group 1–>SSP 1 in super spine switch group 4–>SP 4 in spine switch group 2–>LE 2 in leaf switch group 2–>GPU port 2 of computing node 3 in computing node group 2.

It may be understood that after the corresponding forwarding path is determined based on the target computing node of the data flow, if it is determined that there is a link fault in the forwarding path, another forwarding path may be randomly redetermined from the plurality of equal-cost forwarding paths, and the data flow is forwarded based on the redetermined forwarding path. The redetermined forwarding path is different from the forwarding path corresponding to the target computing node, and there is no link fault in the redetermined forwarding path. For example, a static ECMP method may be used to randomly redetermine another forwarding path from the plurality of equal-cost forwarding paths.

For example, the Bidirectional Forwarding Detection (Bidirectional Forwarding Detection, BFD) Protocol may be used to detect whether a link fault occurs. One forwarding node sends a BFD detection packet to another forwarding node, and if no BFD packet sent by the peer is received within a preset time, it is determined that a link fault occurs between the two forwarding nodes.

For example, the link fault includes an uplink fault, a downlink fault, a leaf switch downlink fault, or the like. In addition, if it is determined that a leaf switch downlink fault occurs, the data flow may also be discarded.

Example 1: Using data flow 1 represented by a solid line in FIG. 6 as an example, GPU port 2 of computing node 1 in computing node group 1 transmits data to GPU port 2 of computing node 1 in computing node group 2. It can be learned from the foregoing step 520 that there are 64 equal-cost forwarding paths for LE 1 in leaf switch group 1, and that the determined forwarding path is path 2. If a fault, referred to as an uplink fault, occurs in path 2, LE 1 in leaf switch group 1 uses static ECMP to randomly determine a forwarding path from the remaining 63 equal-cost forwarding paths.

Example 2: Using the data flow represented in FIG. 7 as an example, GPU port 1 of computing node 2 in computing node group 1 transmits data to GPU port 2 of computing node 3 in computing node group 2. It can be learned from the foregoing step 520 that the forwarding path determined when SSP 1 in super spine switch group 4 forwards the data flow to the SP layer is: SSP 1 in super spine switch group 4–>SP 4 in spine switch group 2. If a fault, referred to as a downlink fault, occurs in this path, similarly to an uplink fault, SSP 1 in super spine switch group 4 uses static ECMP to randomly determine a forwarding path from the plurality of remaining equal-cost forwarding paths.

Example 3: Still using data flow 1 represented by a solid line in FIG. 6 as an example, GPU port 2 of computing node 1 in computing node group 1 transmits data to GPU port 2 of computing node 1 in computing node group 2. When LE 2 in leaf switch group 2 forwards the data flow to GPU port 2 of computing node 1 in computing node group 2, there is an equal-cost forwarding path. In this case, it is determined that the equal-cost forwarding path is a forwarding path. If a fault, referred to as a leaf switch downlink fault, occurs in this forwarding path, because there is only one forwarding path in this case and no other equal-cost forwarding path is selected, LE 2 in leaf switch group 2 can discard the data flow.

According to the data center network load balancing method provided in this application, the leaf switch in the data center network numbers the computing nodes based on a connection order of the computing nodes, and no exhaustive manual configuration is required. The adjacent switches in the data center network synchronize the information of the plurality of computing nodes with each other, and implement autonomous transmission of computing node information, which can adapt to a network architecture change. The forwarding paths corresponding to the plurality of computing nodes are determined based on the information of the plurality of computing nodes, the forwarding paths corresponding to the plurality of computing nodes are equal-cost forwarding paths, and the forwarding paths corresponding to the plurality of computing nodes are different from each other. Therefore, uniform distribution of data flows in the data center network is ensured. In addition, when the data flow is received, the data flow is forwarded based on the forwarding path corresponding to the target computing node of the data flow, and no packet disorder occurs, so that optimal transmission efficiency is approached.

The data center network load balancing method provided in this application uses advance global path planning for load balancing, which is very suitable for scenarios in which flows have significant regularities and characteristics, such as AI cluster training scenarios, where most flows have characteristics of large single-flow bandwidths and training tasks are highly concurrent and coordinated. The method provided in this application uses BGP route advertisements and extended route attributes to achieve autonomous route transmission, which can adapt to a network topology change and requires no exhaustive manual configuration. In addition, in the method provided in this application, all flows are transmitted in order, and network interface cards or switches do not need to reorder packets. Therefore, no packet disorder problem may occur. Finally, the method provided in this application neither requires real-time collection of link load, nor requires global topology awareness or real-time calculation and re-routing. With good stability and robustness, the method can implement uniform distribution of flows on all paths.

This application further provides a data center network load balancing system to implement uniform distribution of data flows on all paths. It may be understood that the system includes leaf switches, or spine switches, or super spine switches in FIG. 1. A schematic flowchart of the method is shown in FIG. 8.

Step 800: Leaf switches in a data center network number connected computing nodes.

For example, each leaf switch in the data center network numbers connected computing nodes in sequence based on a quantity of computing nodes connected to the leaf switch. The computing node is an individual computing unit with a server as an individual, or a plurality of computing units with a plurality of GPUs on a server as individuals. As described above, because a leaf switch has a maximum of 64 interfaces for connecting computing nodes, a maximum of 64 computing nodes can be connected to the leaf switch.

Step 810: Adjacent switches in the data center network synchronize information of a plurality of computing nodes with each other.

For example, the adjacent switches in the data center network synchronize the information of the plurality of computing nodes with each other through BGP route advertisements, and information of each computing node includes a number of the computing node and further includes an IP address of the computing node. The number of each computing node is represented by using an extended attribute of a BGP route. The extended attribute of the BGP route may be represented by a tag (tag), and a value of the tag is the number corresponding to the computing node in step 800.

Step 820: A first switch determines, based on the information of the plurality of computing nodes, forwarding paths corresponding to the plurality of computing nodes, where the forwarding paths corresponding to the plurality of computing nodes are equal-cost forwarding paths, the forwarding paths corresponding to the plurality of computing nodes are different from each other, and the first switch is one of the adjacent switches in the data center network.

For example, the equal-cost forwarding paths are ECMP routes, where the ECMP routes are paths with a same cost from a switch to a next-hop switch of the switch. When determining, based on the information of the plurality of computing nodes, the forwarding paths corresponding to the plurality of computing nodes, the first switch calculates a remainder obtained by dividing the number of each computing node by a quantity of equal-cost forwarding paths, and determines, based on the remainder, a forwarding path corresponding to the computing node from the plurality of equal-cost forwarding paths. Because numbers of the computing nodes included in the information of the computing nodes are different, remainders obtained by dividing the numbers of the computing nodes by the quantity of equal-cost forwarding paths are different, and further, the forwarding paths determined based on the remainders are different. In this way, the forwarding paths are uniformly bound to the numbers of the computing nodes.

For example, after determining, based on the information of the plurality of computing nodes, the forwarding paths corresponding to the plurality of computing nodes, the first switch generates a forwarding entry corresponding to each computing node, where the forwarding entry corresponding to each computing node indicates a correspondence between a forwarding path corresponding to the computing node and the IP address of the computing node.

For details, refer to the foregoing step 510.

Step 830: When receiving a data flow, the first switch forwards the data flow based on a forwarding path corresponding to a target computing node of the data flow.

For example, before forwarding the data flow based on the forwarding path corresponding to the target computing node of the data flow, the first switch determines, by querying a forwarding entry based on an IP address of the target computing node, the forwarding path corresponding to the target computing node, and forwards the data flow based on the forwarding path corresponding to the IP address of the target computing node.

For details, refer to the foregoing step 520.

More detailed descriptions or examples of the foregoing steps 800, 810, 820, and 830 may be directly obtained by referring to the related descriptions in the method embodiment shown in FIG. 5. Details are not described herein again.

It may be understood that, to implement functions in the foregoing embodiment, a host includes a corresponding hardware structure and/or software module for performing each function. A person skilled in the art should be easily aware that, with reference to units and method steps in the examples described in embodiments disclosed in this application, this application can be implemented by hardware or a combination of hardware and computer software. Whether a function is performed by hardware or hardware driven by computer software depends on particular application scenarios and design constraints of the technical solutions.

Figure 10:
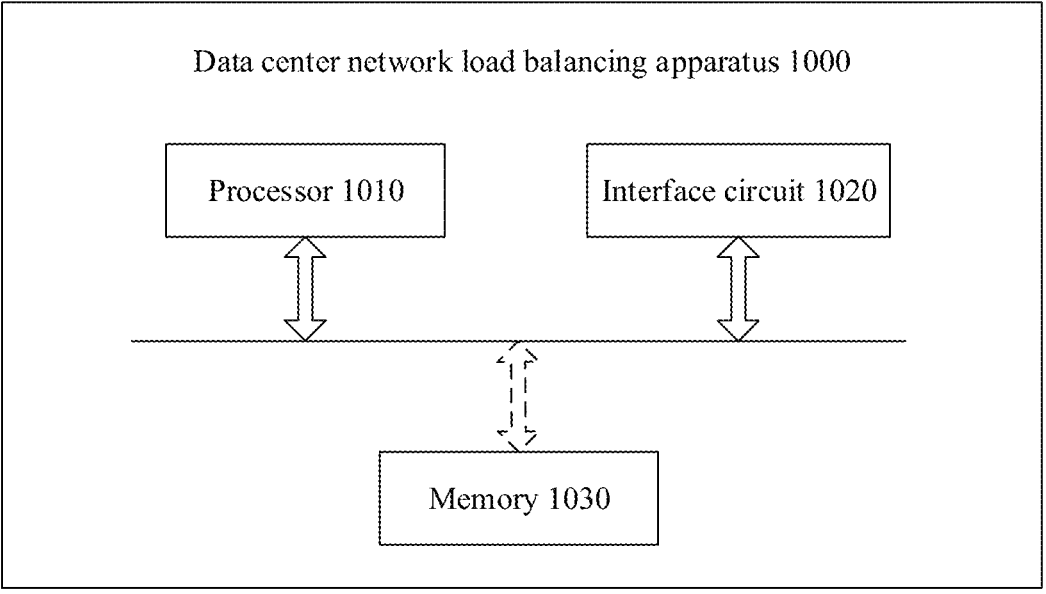
FIG. 10 is a second schematic diagram of a structure of a data center network load balancing apparatus according to an embodiment of this application.

FIG. 9 and FIG. 10 are schematic diagrams of structures of possible data center network load balancing apparatuses according to an embodiment of this application. These data center network load balancing apparatuses may be configured to implement functions of the switch in the foregoing method embodiment, and therefore can also achieve the beneficial effect of the foregoing method embodiment.

As shown in FIG. 9, a data center network load balancing apparatus 900 includes a receiving unit 910, a processing unit 920, and a sending unit 930. The data center network load balancing apparatus 900 is configured to implement the functions of the switch in the foregoing method embodiment shown in FIG. 5.

When the data center network load balancing apparatus 900 is configured to implement the functions of the switch in the foregoing method embodiment shown in FIG. 5, the receiving unit 910 is configured to obtain information of a plurality of computing nodes;

the processing unit 920 is configured to determine, based on the information of the plurality of computing nodes, forwarding paths corresponding to the plurality of computing nodes, where the forwarding paths corresponding to the plurality of computing nodes are equal-cost forwarding paths, and the forwarding paths corresponding to the plurality of computing nodes are different from each other; and the sending unit 930 is configured to forward a data flow based on a forwarding path corresponding to a target computing node of the data flow when the data flow is received.

In a possible design, when obtaining the information of the plurality of computing nodes, the receiving unit 910 is configured to obtain the information of the plurality of computing nodes through a BGP route advertisement.

In a possible design, information of each computing node includes a number of the computing node; and the processing unit 920 is configured to: when determining, based on the information of the plurality of computing nodes, the forwarding paths corresponding to the plurality of computing nodes, calculate a remainder obtained by dividing the number of each computing node by a quantity of a plurality of equal-cost forwarding paths; and determine, based on the remainder, a forwarding path corresponding to the computing node from the plurality of equal-cost paths.

In a possible design, the plurality of equal-cost forwarding paths are ECMP routes, where the ECMP routes are paths with a same cost from the switch to a next-hop switch of the switch.

In a possible design, the processing unit 920 is configured to number connected computing nodes in sequence based on a quantity of the connected computing nodes.

In a possible design, information of each computing node further includes an IP address of the computing node; and after determining, based on the information of the plurality of computing nodes, the forwarding paths corresponding to the plurality of computing nodes, the processing unit 920 is configured to generate a forwarding entry corresponding to each computing node, where the forwarding entry corresponding to each computing node indicates a correspondence between a forwarding path corresponding to the computing node and the IP address of the computing node.

In a possible design, before the data flow is forwarded based on the forwarding path corresponding to the target computing node of the data flow, the processing unit 920 is configured to query the forwarding entry based on an IP address of the target computing node to determine the forwarding path corresponding to the target computing node.

A more detailed description of the receiving unit 910, the processing unit 920, and the sending unit 930 may be directly obtained by referring to the related description in the method embodiment shown in FIG. 5. Details are not described herein again.

As shown in FIG. 10, a data center network load balancing apparatus 1000 includes a processor 1010 and an interface circuit 1020. The processor 1010 and the interface circuit 1020 are coupled to each other. It may be understood that the interface circuit 1020 may be a transceiver or an input/output interface. Optionally, the data center network load balancing apparatus 1000 may further include a memory 1030, configured to store instructions executed by the processor 1010, or store input data required by the processor 1010 to run the instructions, or store data generated after the processor 1010 runs the instructions.

When the data center network load balancing apparatus 1000 is configured to implement the method shown in FIG. 5, the processor 1010 is configured to implement functions of the processing unit 920, and the interface circuit 1020 is configured to implement functions of the receiving unit 910 and the sending unit 930.

In the embodiments of this application, division into units is an example, is merely division into logical functions, and may be other division during actual implementation. In addition, functional units in the embodiments of this application may be integrated into one processor, or each of the units may exist alone physically, or two or more units may be integrated into one unit. The integrated unit may be implemented in a form of hardware, or may be implemented in a form of a software functional unit.

Although preferred embodiments of this application have been described, a person skilled in the art can make additional changes and modifications to these embodiments once the basic inventive concept is learned. Therefore, the appended claims shall be construed to cover the preferred embodiments and all changes and modifications falling within the scope of the embodiments of this application.

Apparently, a person skilled in the art can make various changes and variations to this application without departing from the scope of this application. Therefore, this application is also intended to cover the changes and variations provided that the changes and variations of this application fall within the scope of the claims of this application or equivalent technologies thereof.

What is claimed is:

1. A data center network load balancing method, applied to a communication device in a data center network and comprising the following steps:

obtaining information of a plurality of computing nodes connected to the communication device, wherein the information of the plurality of computing nodes comprises numbers corresponding to the plurality of computing nodes, respectively;

determining, based on the numbers corresponding to the plurality of computing nodes, forwarding paths corresponding to the plurality of computing nodes, respectively, wherein the forwarding paths corresponding to the plurality of computing nodes are equal-cost forwarding paths from the communication device to intermediate communication devices, respectively, and the equal-cost forwarding paths corresponding to the plurality of computing nodes are different from each other; and when receiving a data flow, forwarding the data flow based on a respective one of the equal-cost forwarding paths corresponding to a target computing node of the data flow to a respective one of the intermediate communication devices corresponding to the respective equal-cost forwarding path; wherein information of the target computing node comprises a number of the target computing node;

the determining, based on the numbers of the plurality of computing nodes, the forwarding paths corresponding to the plurality of computing nodes comprises:

calculating a remainder obtained by dividing the number of the target computing node by a quantity of the equal-cost forwarding paths; and determining, based on the remainder, the forwarding path corresponding to the target computing node from the equal-cost forwarding paths;

wherein the information of the target computing node comprises an Internet Protocol (IP) address or a Media Access Control (MAC) address of the target computing node, and before the forwarding the data flow based on the respective one of the equal-cost forwarding paths corresponding to the target computing node of the data flow to the respective one of the intermediate communication devices corresponding to the respective equal-cost forwarding path, the method further comprises:

querying a forwarding entry based on the IP address or the MAC address of the target computing node to determine the respective equal-cost forwarding path corresponding to the target computing node.

2. The method according to claim 1, wherein the number of the target computing node is represented by using an extended attribute of a Border Gateway Protocol (BGP) route.

3. The method according to claim 2, wherein the extended attribute of the BGP route is represented by a tag.

4. The method according to claim 1, wherein the method further comprises:

numbering the plurality of connected computing nodes in sequence based on a quantity of the plurality of connected computing nodes.

5. The method according to claim 1, wherein after the determining, based on the numbers of the plurality of computing nodes, the forwarding paths corresponding to the plurality of computing nodes, respectively, the method further comprises:

generating the forwarding entry corresponding to the target computing node, wherein the forwarding entry corresponding to the target computing node indicates a correspondence between the forwarding path corresponding to the target computing node and the IP or MAC address of the target computing node.

6. The method according to claim 1, wherein after the determining the forwarding path corresponding to the target computing node, the method further comprises:

determining, in response to determining a link fault in the forwarding path, another forwarding path from the equal-cost forwarding paths as the forwarding path corresponding to the target computing node.

7. The method according to claim 1, wherein the target computing node is an individual computing unit with a server as an individual, or a plurality of computing units with a plurality of graphics processing units (GPUs) on a server as an individual.

8. The method according to claim 1, wherein the data center network is a networking architecture with a spine switch and a leaf switch.

9. The method according to claim 1, wherein the data center network is a networking architecture with a super spine switch, a spine switch, and a leaf switch.

10. A data center network load balancing system, comprising:

a leaf switch in a data center network, comprising one or more first processors and one or more first memories, wherein the one or more first memories store one or more programs, and when the programs are executed by the one or more first processors, the leaf switch configured to number connected computing nodes;

adjacent switches in the data center network, comprising one or more second processors and one or more second memories, wherein the one or more second memories store one or more programs, and when the programs are executed by the one or more second processors, the adjacent switches configured to synchronize information of a plurality of computing nodes with each other, wherein the information of the plurality of computing nodes comprises numbers corresponding to the plurality of computing nodes, respectively; and a first switch, configured to determine, based on the numbers corresponding to the plurality of computing nodes, forwarding paths corresponding to the plurality of computing nodes, respectively, wherein the forwarding paths corresponding to the plurality of computing nodes are equal-cost forwarding paths from the first switch to other switches of the adjacent switches, respectively, the equal-cost forwarding paths corresponding to the plurality of computing nodes are different from each other, and the first switch is one of the adjacent switches in the data center network, wherein when the first switch receives a data flow, the first switch is further configured to forward the data flow based on a respective one of the equal-cost forwarding paths corresponding to a target computing node of the data flow to a respective one of the other switches corresponding to the respective equal-cost forwarding path;

wherein the first switch is configured to:

calculate a remainder obtained by dividing a number of the target computing node by a quantity of the equal-cost forwarding paths;

determine, based on the remainder, the forwarding path corresponding to the target computing node from the equal-cost forwarding paths;

wherein the information of the target computing node comprises an Internet Protocol (IP) address or a Media Access Control (MAC) address of the target computing node, and before the forwarding the data flow based on the respective one of the equal-cost forwarding paths corresponding to the target computing node of the data flow to the respective one of the intermediate communication devices corresponding to the respective equal-cost forwarding path, the method further comprises:

querying a forwarding entry based on the IP address or the MAC address of the target computing node to determine the respective equal-cost forwarding path corresponding to the target computing node.

11. The system according to claim 10, wherein after the determining, based on the numbers corresponding to the plurality of computing nodes, the forwarding paths corresponding to the plurality of computing nodes, respectively, the system further comprises:

generating the forwarding entry corresponding to the target computing node, wherein the forwarding entry corresponding to the target computing node indicates a correspondence between the forwarding path corresponding to the target computing node and the IP address or the MAC address of the target computing node.

12. A communication device, comprising one or more processors and one or more memories, wherein the one or more memories store one or more programs, and when the programs are executed by the one or more processors, the apparatus is enabled to perform the method according to claim 1.

13. A non-transitory computer-readable storage medium, wherein the computer-readable storage medium stores computer-executable instructions, and when executed by a processor, the computer-executable instructions are used to implement the method according to claim 1.

* * * * *